United States Patent Office 3,518,530
Patented June 30, 1970

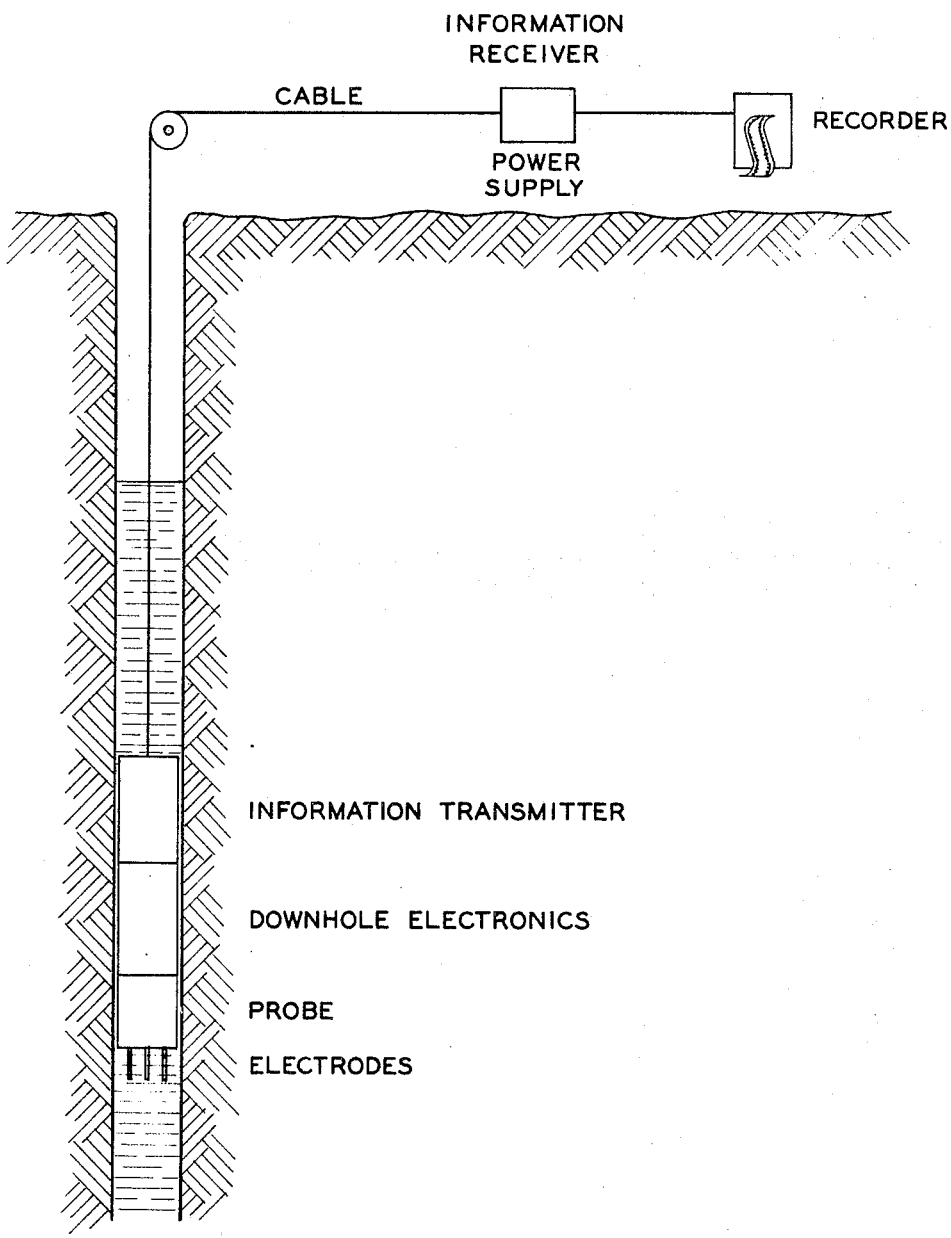

3,518,530
ELECTROCHEMICAL PROCESS FOR STUDYING AND DETERMINING THE NATURE OF FLUID-CONTAINING UNDERGROUND FORMATIONS
Homer M. Wilson, Houston, Tex., assignor to Petrolite Corporation, Wilmington, Del., a corporation of Delaware
Filed Oct. 17, 1966, Ser. No. 587,178
Int. Cl. G01v 9/00
U.S. Cl. 324—1     2 Claims

ABSTRACT OF THE DISCLOSURE

Electrochemical process for studying and determining the nature of fluid-containing underground formations wherein a metal test specimen electrode together with a metal current electrode and a metal reference electrode is lowered through a borehole in said formation, the polarization characteristics of the metal of the test specimen are measured and said polarization characteristics are correlated with the fluids of the formation and said formation generally.

---

This invention relates to the use of an electro-chemical technique, in the study of underground formations. More particularly, this invention is concerned with the procurement and use of polarization characteristics of metals, when placed in underground formations, generally in oil wells, either directly or in cooperation with other electrical properties of the formations to determine the nature of the formation and/or the fluid contents of those formations; thus providing a more comprehensive, rapid and reliable determination of the character of this formation.

Drilling and producing oil wells is difficult and costly. One reason for this is that the true conditions inside the bore hole are poorly known, as a rule, at all depths—hence a considerable element of trial and error affects the venture. Any approach which may improve this situation, and extract more data from the well formation is helpful. Every scrap of information, however, small, helps. To attain it, is the function of logging, sampling, and testing. For this purpose, numerous processes and methods have been devised. An array of tools has been introduced into the well to make measurements thereof.

Since the purpose of drilling is to reach the formations containing hydrocarbons and to exploit them, it is important to know the conditions which prevail in these beds—porosity, saturation, rock, pressure, temperature, etc.—because this data allows one to compute the true conditions of the reservoir.

Thus, there has developed throughout the years various means of evaluating the true conditions inside the bore hole including:

Sampling and coring in percussion drilling
Sampling and coring in rotary drilling
Diamond core drilling
Micro-paleontological analysis
Heavy-minerals correlations
Drilling-time logging
Mud logging
Side-wall sampling
Electrical logging
Induction logging
Nuclear logging
Velocity logging
Caliper logging
Temperature surveys
Testing for fluid samples In application S.N. 332,399 filed Dec. 23, 1963, now U.S. Pat. No. 3,406,101, granted on Oct. 15, 1968, there is described a process and apparatus wherein the apparatus is done for rapidly determining the rate of corrosion, of a metallic material by means of polarization measurements in an electrolytic solution which comprises test probe means including, three electrodes comprising a test specimen, a reference electrode and a third electrode, said test specimen and said reference electrode being substantially identical and formed of said metallic material, said test probe means being adapted to be immersed in said electrolytic solution, means for passing a measureable amount of a polarizing current through said third electrode and said test specimen in an amount sufficient to polarize said test specimen a predetermined amount including a source of direct current, a circuit connecting said third electrode and said test specimen to said source, means arranged in said circuit across said source for accurately controlling the current supplied to said first electrode, a means in said circuit for measuring the current, and means arranged in an external circuit between the test specimen and said reference electrode for metering said predetermined amount of polarization of the cathode wtih respect to said reference electrode. The process is one for rapidly determining the rate of metallic material in an electrolytic solution by means of polarization measurements comprising immersing three essentially identical electrodes formed of said metallic material in said solution, one electrode being an anode and another electrode being a cathode with the third electrode being a reference electrode arranged adjacent at least one of said anode and said cathode, said electrodes having a predetermined exposed surface area, passing direct current through a circuit including said anode, said solution and said cathode in an amount sufficient to effect a predetermined measurable polarization of said one and said anode and said cathode with respect to said reference electrode, detecting electrically and metering the current density with respect to corrosion rate weigth loss of the electrode required to obtain said predetermined polarization of said one of said cathode and said anode with respect to the reference electrode to produce a composite corrosion rate-polarization resistance curve whereby the corrosion rate of an electrode of said metal in contact with an electrlytic environment similar to the said electrolytic solution can be correlated with aspects of the curve and determined by electrically measuring the current density required for an electrode of said metal and said predetermined surface area to obtain said predetermined polarization when immersed in said electrolyic environment. Also described with said apparatus and said process is a corrosion test probe assembly suitable for determining the rate of corrosion of a metallic material by means of polarization measurements comprising a test probe body having a shouldered bore extending therethrough, an electrically insulating insert in said bore having an outer shoulder coating at the shoulder of said test probe body, said insert having three shouldered bores extending therethrough, an electrically conductive insert for each of said insulating insert bores having an outer shoulder seating against the shoulder of the respective insulating insert bores, said conductive insert having means at one end adapted for the attachment thereto of electrical leads, and three essentially identical metallic electrodes each removable connected to the other end of a respective conductive insert.

An improved probe which can be employed in this invention is described in S.N. 558,124 filed June 16, 1966 which application is by reference incorporated into the present application as if a part hereof.

I have now discovered that the polarization characteristics of metals is a valuable source of information for appraising the environment in which the metals are placed. Thus, if the instrument of the type described in S.N. 332,399 is placed in the fluids of a bore hole or lowered into the bore hole of a well, one can obtain information relating to the conditions therein. Thus, by lowering the electrodes of the meter into the fluids of the formation, one can take readings as they are lowered down hole.

The readings on the instrument can be correlated to the conditions in the bore hole which in turn is correlated to conditions of the formation so as to more expeditiously reach the formations of hydrocarbons and to explait them. By employing this data, either alone or in conjunction with other measures obtained by other logging means, one is able to determine the nature of the formation and the probable presence of oil, natural gas, mineral deposits, formation water, acidizing solutions, etc., and/or at what depths such fluids reside or changes in composition, temperature, pressures, etc. occur.

Ferrous, or other suitable metals described in S.N. 332,399 and S.N. 558,124, can be employed in this invention.

EXAMPLE

The advantages of this invention will be apparent to those skilled in the art from the following description in which the figure is a schematic embodiment.

As shown in the drawing, the logging instrument is made up of the following parts:

(A) Electrochemical probe
(B) Downhole electronics
(C) Downhole information transmitter
(D) Cable
(E) Surface electronics
(F) Recorder The Electrochemical probe has three types of electrodes, (1) Test Electrode, (2) Reference Electrode, and (3) Current Electrode.

One each of the above types of electrodes mounted in the probe and extending into the well fluids will provide the necessary information for the well log. However, the number of electrodes can vary in accordance to desired accuracy; more electrodes may be used in multiple logs, fewer electrodes for less accurate logs.

Two electrical circuit paths must be completed through the test electrode: A voltage potential loop through the reference electrode and the test electrode, and, a current loop through the current electrode and the test electrode.

The impedance in the potential loop is made as high as possible so that, substantially, no current flows through the reference electrode to reduce its polarization to a minimum.

With no current flowing in the current loop, there exists a potential in the voltage loop called the "Off-set Potential." As current is applied to the current loop, the voltage will change in the voltage loop. The resulting amount of measurable voltage change represents the polarization of the test electrode.

It has been determined that for voltage change ($\Delta E$) due to the application of the test current ($\Delta I$): The following relationship has sufficient accuracy at $\Delta E \approx 50$ mv. but even better accuracy as $\Delta E$ approaches zero. Due to the problems of designing amplifiers for measurement of such small voltage, a $\Delta E$ of close to 10 mv. to 20 mv. gives probably the best compromise for a well-logging environment. This relationship is:

$$(EF) = K \frac{\Delta I}{\Delta E}$$

(EF) = Electrochemical factor
(K) = Factor determined by size and configuration of electrodes and the scale used for logging purposes.

The downhole electronics determines the electrochemical factor (EF) by controlling $\Delta I$ so the $\Delta E$ becomes a predetermined amount $\Delta E_x$.

Then $$(EF) = K \frac{\Delta I}{\Delta E}$$

becomes $(EF) = K_x \Delta I$ where $$K_x = \frac{K}{\Delta E_x}$$

The selection of $\Delta E$ to be a predetermined amount is to illustrate one of the more simple electronic packages. As long as (EF) has been determined, the downhole electronics is functioning properly.

(EF) is taken from the downhole electronics by the downhole information transmitter, transmitted up the cable by some conventional transmittion technique to the information receiver on the surface of the ground; where the factor is then recovered and recorded in the recorder, in relationship to some other functions, such as depth, time, pressure, temperature, etc.

The electrochemical log may also be used as a compensation device for the various types of logs where the electrochemical properties of the fluid have caused unmeasured errors (polarization, for example). Also the electrochemical log will provide direct information about the nature of the fluids in the bore hole; such information may include the presence of surface water, formation water or materials added at the surface, e.g. mud weighing materials, acids, etc. This invention is employed advantageously in evaluating drilling fluids such as drilling muds, foam drilling effluents, etc.

Since may ways will readily suggest themselves to those skilled in the art for utilizing the general principles described herein, it is understood that the invention is not limited to the examples shown, but that it includes within its purview whatever changes fairly fall within the spirit of the invention.

Having thus described my invention what I claim as new and desire to obtain by Letters Patent is

1. An electrochemical process for studying underground formations including fluids, which is characterized by (1) immersing, together with an electrochemical factor determining means (EF) and an information transmitter means operatively associated with said electrochemical determining factor means, a test specimen electrode of a metallic material together with a current electrode of a metallic material and a reference electrode of a metallic material in said fluids, said test electrode being operatively associated with said electrochemical factor determining means (EF), said electrochemical factor being dependent on the voltage between the reference electrode and the test electrode and the current between said current electrode and said test electrode, (2) controlling said current to maintain said voltage a predetermined amount, (3) measuring the electrochemical factor as an indication of the polarization characteristics of the metallic material of the test specimen so immersed in the fluids of said underground formation, (4) transmitting said electrochemical factor from said information transmitter means to a receiving means at the surface of said underground formation, and (5) correlating said polarization characteristics with said fluids and said formation.

2. The process of claim 1 wherein said electrodes formed of a metallic material are essentially identical, one electrical being an anode and another electrode being a cathode with the third electrode being the reference electrode arranged adjacent to at least one of said anode and said cathode, said electrodes having a predetermined exposed surface area, and direct current is passed through the circuit including said anode, said fluids and said cathode in an amount sufficient to effect a predetermined measurable polarization of said one of said anode and said cathode with respect to said reference electrode.

References Cited

UNITED STATES PATENTS

| | | | |
|---|---|---|---|
| 2,085,664 | 6/1937 | Karcher | 324—1 XR |
| 2,190,320 | 2/1940 | Potapenko | 324—1 |
| 2,199,705 | 5/1940 | Karcher | 324—1 |
| 2,655,631 | 10/1953 | Walstrom | |
| 2,228,223 | 1/1941 | Bays | 324—10 XR |
| 3,406,101 | 10/1968 | Kilpatrick | 324—71 XR |
| 1,865,847 | 7/1932 | Ennis | 324—2 |
| 3,279,249 | 10/1966 | Tocanne | 324—11 XR |

G. R. STRECKER, Primary Examiner

U.S. Cl. X.R.

204—195; 324—11